United States Patent [19]

Muller et al.

[11] 3,723,516

[45] Mar. 27, 1973

[54] PROCESS FOR THE PREPARATION OF POLYBASIC BENZENE CARBOXYLIC ACIDS

[75] Inventors: Helmut Muller; Karl Peterlein, both of Gladbeck, Germany

[73] Assignee: Gelsenberg Benzin Aktiengesellschaft, Gelsenkirchen-Horst, Germany

[22] Filed: Nov. 2, 1970

[21] Appl. No.: 86,298

Related U.S. Application Data

[63] Continuation of Ser. No. 708,641, Feb. 16, 1968, abandoned.

[30] Foreign Application Priority Data

Feb. 16, 1968 Germany ..............................G 49309

[52] U.S. Cl. ..........................260/524 R, 260/346.4

[51] Int. Cl. ......................C07d 63/32, C07d 63/14
[58] Field of Search............................260/346.4, 524

[56] References Cited

UNITED STATES PATENTS 3,261,860  7/1966  Becke et al............................260/524

Primary Examiner—Alex Mazel
Assistant Examiner—Bernard Dentz
Attorney—Burgess, Dinklage & Sprung

[57] ABSTRACT

Production of aromatic compounds having a multiplicity of carboxy groups pendant therefrom by vapor phase air oxidation of alkyl and nitrile substituted aromatic compounds to first produce the corresponding cyano alkyl substituted aromatic carboxylic acid or anhydride; and then hydrolyzing the nitrile to the free acid product.

4 Claims, No Drawings

PROCESS FOR THE PREPARATION OF POLYBASIC BENZENE CARBOXYLIC ACIDS

This application is a streamlined continuation of Ser. No. 708641 filed Feb. 16, 1968 and now abandoned.

Only those alkyl aromatic compounds can be transformed by air oxidation in the gaseous phase into the corresponding carboxylic acids with satisfactory yields which deliver carboxylic acids as end products, which, like phthalic acid and pyromellitic acid, form easily volatile anhydrides, or which, like benzoic acid as a free acid, have a relatively high vapor pressure. Thus, for example, p-xylene or pseudocumene cannot be transformed in the gaseous phase into the corresponding acids with technically satisfactory yields. This is attributed to the fact that polybasic benzene carboxylic acids which have free carboxyl groups alone or in addition to anhydride groups form non-volatile, polymeric compounds on the catalyst, which are decomposed as the oxidation continues. Furthermore, with these compounds the danger of decarboxylation and hence the formation of undesired byproducts is very great. Only in the case of benzoic acid is the vapor pressure so high that the free acid can be produced by air oxidation in the gaseous phase.

It has already been proposed to use the esters of alkylbenzenecarboxylic acids in gaseous-phase air oxidation in order thus to arrive at polybasic benzenecarboxylic acids. Nevertheless the yields in this case are low, since the esters are in part destroyed under the conditions involved.

It has now been found that polybasic benzene carboxylic acids are obtained by the gas phase oxidation of aromatic compounds of the general formula B — $\phi$ — A, wherein B is at least one substituent oxidizable to a carboxylic acid or an anhydride group, A is a nitrile group or a group which is capable of nitrile formation under the oxidation conditions, and $\phi$ is an aromatic or naphthene nucleus. The nitrile group is in addition to an alkyl group in the third or fourth position, or in addition to two to four adjacent alkyl groups, i.e., alkyl radicals that form anhydrides upon oxidation. The oxidation products are then saponified (hydrolyzed).

If, for example, the reactant is m- or p-toluonitrile, the methyl group is oxidized to the carboxyl group, while the nitrile group is not attacked. The resultant 3- or 4-cyanobenzoic acid has so much higher vapor pressure than does isophthalic acid or terephthalic acid, as the case may be, that it is carried out of the oxidation furnace before it is completely oxidized, i.e., burned.

In like manner it is possible to arrive at tricarboxylic acids having two adjacent carboxyl groups. In this case even substantially better yields are achieved than in the production of dicarboxylic acids. For example, to obtain trimellitic acid one sets out from 1,2-dimethyl-4-cyanobenzene. In the oxidation the two methyl groups give the anhydride of the dicarboxylic acid, while the nitrile group is not attacked. The The 4-cyan-o-phthalic anhydride is obtained in a yield of 73 wt-% = 55 mole-% which is a good yield for gaseous-phase air oxidation. The 4-cyan-o-phthalic anhydride can easily be separated by vacuum distillation from small quantities of dark-colored byproducts, and, in the saponification, it yields the desired trimellitic acid. If in the product application it is possible to use the 4-cyan-o-phthalic anhydride directly to good advantage for the production of the desired secondary products, the saponification to trimellitic acid can be omitted.

Another advantage of the process of the invention is to be seen in the fact that not only aromatic benzene derivatives can be used, but also their tetrahydro compounds, which are obtained in very good yields by diene synthesis. If, for example, 2,3-dimethylbutadiene-1,3 and acrylonitrile are reacted in a molar ratio of 1 : 1 at 150°C, a better than 75 mole-% yield is obtained of 1,2-dimethyl-4-cyanocyclohexene-1 with better than 99 percent purity. If this product is subjected to air oxidation in the gaseous phase, it is transformed to 4-cyan-o-phthalic anhydride in the same yield as the 1,2-dimethyl-4-cyanobenzene. The dehydrogenation of the cyclohexene ring and the oxidation of the methyl groups to the anhydride of the dicarboxylic acid thus take place in a single working procedure.

By the introduction of the nitrile group into that place on the molecule at which a carboxyl group that can form no anhydride is located, it is possible to win carboxylic acids by the gaseous-phase air oxidation which are not obtainable by the direct oxidation of the corresponding alkyl aromatics.

It has furthermore developed that the nitrile group is not absolutely necessary in the starting product and that nitrous compounds can also be used which form the nitrile group under the conditions of the gaseous-phase air oxidation. For example, 4-cyan-o-phthalic anhydride is obtained by gaseous-phase air oxidation of 3,4-dimethyltetrahydrobenzoic acid amide which is obtained in turn from 1,3-dimethylbutadiene-1,3 and acrylic acid amide.

A number of examples are given hereinbelow, in which polybasic benzenecarboxylic acids were prepared by the process set forth above. The experiments were performed at about 400°C in a 1-liter salt bath furnace, using a catalyst that had been prepared by fusing a mixture of 40 g $TiO_2$ and 120 g $V_2O_5$ onto 1 liter of silicon carbide. The peak temperatures in the reaction zone were about 30°C above the salt bath temperature. Approximately 10 g of starting material were injected per cubic meter of air at normal temperature and pressure. The reactants and the air were raised to 200° – 250°C before they went into the reactor. The air coming from the furnace with the oxidation products was was conducted through a glass pipe in which the sublimable oxidation products separate, but no fractionation was attempted. The oxidation products were esterified either directly or after saponification with HCl and tested by gas fractometry.

EXAMPLE 1

Tetrahydrotoluonitrile obtained from isoprene and acrylonitrile was subjected to air oxidation in the gaseous phase. The starting product was composed of 67.8 percent by weight of the p isomer and 25 percent by weight of the m isomer. The air oxidation produced 46 percent by weight of an oxidation product which, after saponification, consisted of 49.5 wt-% terephthalic acid and 27.3 wt-% isophthalic acid.

EXAMPLE 2

1,2-dimethyl-4-cyanobenzene was oxidized in the gaseous phase with air under the conditions stated above. 73.2 wt-% = 55.2 mole-% of 4-cyan-o-phthalic anhydride was produced. The 4-cyan-o-phthalic anhydride was saponified with concentrated hydrochloric acid to produce trimellitic acid in quantitative theoretical yields.

EXAMPLE 3

In the gaseous-phase oxidation of 1,2-dimethyl-4-cyanocyclohexene-1, 77 wt-% of oxidation product was obtained, which precipitated partially in the form of matted needles and partially as a molten substance that had hardened. The oxidation product was very well separated from small amounts of colored byproducts by distillation in vacuo. Two fractions were collected, one having a $BP_{11}$ of 195°–203°C containing 96.6 wt-%, and the other having a $BP_{11}$ of 203°–225°C containing 89.9 wt-%, of 4-cyano-o-phthalic anhydride. The impurities consisted mainly of trimellitic anhydride.

EXAMPLE 4

In a further experiment, 3,4-dimethyl-tetrahydrobenzoic acid amide was subjected to the oxidation as set forth in Example 1. This product could not be injected with a pump on account of its high melting point. Subsequently it was heated to 180°C in a glass vessel and a partial current of the combustion air was conducted through this vessel. 50–60 wt-% of oxidation product resulted, having a content of 58.2 wt-% of 4-cyan-o-phthalic anhydride.

We claim:

1. Process for the production of polybasic benzene carboxylic acids having two to three carboxylic acid substituents on said benzene ring which comprises reacting gas phase molecular oxygen containing gases with a compound of the formula:

$$B' - \phi' - A'$$

wherein $\phi'$ is a benzene or cyclohexene ring, A' is a member selected from the group consisting of a nitrile group and a carbamoyl group capable of forming a nitrile group under the conditions of this oxidation, and B' is one or two alkyl substituents in the third or fourth, or both positions with respect to said A' group capable of being oxidized to a carboxylic acid group or to one carboxylic acid anhydride group; carrying out said reaction at about 350° to 550°C in the vapor phase in contact with a vanadium containing oxidation catalyst to produce a product of the formula:

$$B - \phi - A$$

wherein $\phi$ is a benzene ring, A is a nitrile group and B is either a carboxylic acid group in the third or fourth position or one carboxylic acid anhydride group in the third and fourth position; and hydrolyzing said $B - \phi - A$ product to its polybasic benzene carboxylic acid corresponding compound.

2. Process claimed in claim 1, wherein said oxidized species product is directly reacted to form an ester.

3. Process claimed in claim 1, wherein said A' is carbamoyl.

4. Process claimed in claim 1, wherein said catalyst contains oxides of vanadium and titanium in a 3 to 1 weight ratio.

* * * * *

PO-1050
(5/69)

UNITED STATES PATENT OFFICE
CERTIFICATE OF CORRECTION

Patent No. 3,723,516　　　　　　　　Dated March 27, 1973

Inventor(s) HELMUT MULLER et al

It is certified that error appears in the above-identified patent and that said Letters Patent are hereby corrected as shown below:

Front page, under "Foreign Application Priority Data", "Feb. 16, 1968" should read --Feb. 16, 1967--

Signed and sealed this 22nd day of January 1974.

(SEAL)
Attest:

EDWARD M. FLETCHER, JR.　　　　RENE D. TEGTMEYER
Attesting Officer　　　　　　　　Acting Commissioner of Patents